E. T. CARNS & A. R. BISHOP.
PLANTER MARKER.
APPLICATION FILED JUNE 17, 1916.

1,222,522.

Patented Apr. 10, 1917.
2 SHEETS—SHEET 1.

WITNESSES
Frank C. Palmer
J. E. Larsen

INVENTORS
E. T. Carns
A. R. Bishop
BY
ATTORNEYS

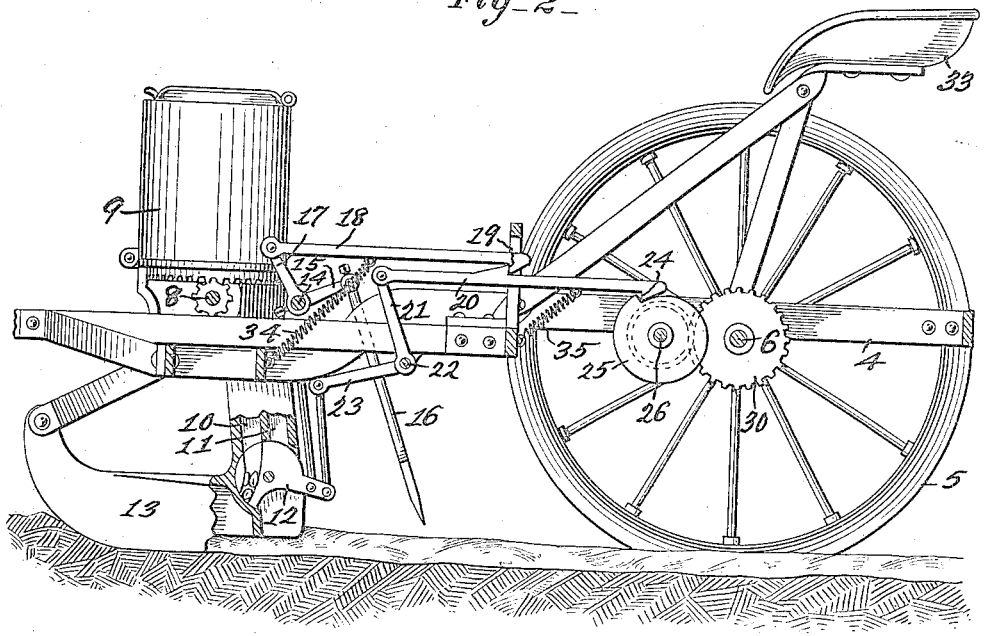
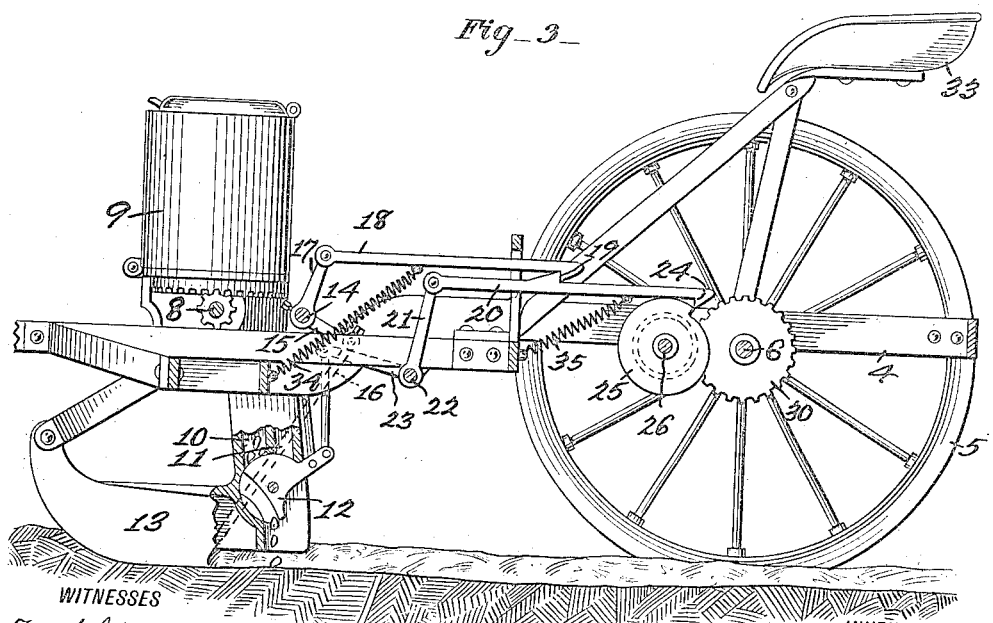

UNITED STATES PATENT OFFICE.

EMMETT T. CARNS AND ALFRED R. BISHOP, OF MURRAY, IOWA.

PLANTER-MARKER.

1,222,522.

Specification of Letters Patent.     Patented Apr. 10, 1917.

Application filed June 17, 1916.   Serial No. 104,188.

*To all whom it may concern:*

Be it known that we, EMMETT T. CARNS and ALFRED R. BISHOP, citizens of the United States, and residents of Murray, in the county of Clarke and State of Iowa, have invented certain new and useful Improvements in Planter-Markers, of which the following is a specification.

Our invention relates to planters, as for corn, and the main object thereof is to provide a marker as an attachment for a planter to supplant the check wire or rope now in common use, and further objects are to provide means for automatic marker operation, and means for throwing the marker out of operative position if desired.

The invention is fully described in the following specification, of which the accompanying drawings form a part, in which similar characters refer to similar parts in each of the views, and in which:—

Fig. 2 is a section taken on the line 2—2 of Fig. 1 with the marker poised ready for operation, and showing also the dropper in closed position; and Fig. 3 is a view similar to Fig. 2 but showing the marker at the end of its operating stroke ready for return to normal position, and showing the dropper in action.

Figure 1:
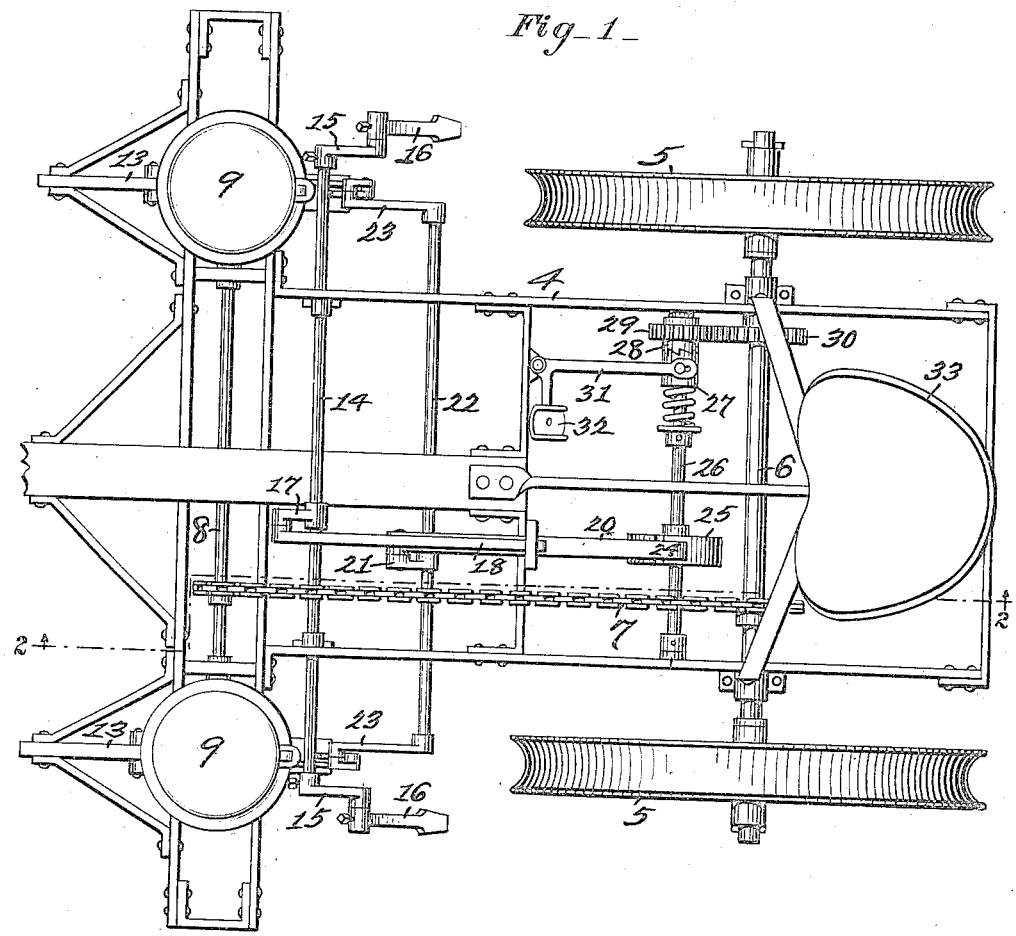
Figure 1 is a top plan view of a planter provided with our invention.

Referring to the drawings, 4 represents the frame of a corn planter mounted on grooved wheels 5 secured to a shaft or axle 6 to insure the rotation of the latter in the forward movement of the planter, said axle carrying a sprocket wheel for a chain 7 passed around a sprocket wheel on a shaft 8 at the forward end of the planter for dropping the corn from the hoppers 9 in any suitable manner to the chutes 10 and 11 controlled by a rotary valve 12 at the rear of the shoe 13.

Our attachment comprises a transverse shaft 14 having an arm 15 at each end carrying the marker rods 16, said shaft 14 being rocked by an arm 17 in pivotal connection with a bar 18 in normal hooked engagement, at 19, with a bar 20 in pivotal connection with an arm 21 on a shaft 22 provided with arms 23 in operative connection with the valve 12, the rearward end of said bar 20 being hooked at 24 and rests upon a cam 25 rotatable with a shaft 26 having a clutch member 27 thereon in normal engagement with a clutch member 28 carried by a pinion 29 freely rotatable on the shaft 26 and revolved by means of a gear 30 keyed to the axle 6, said clutch members being adapted to be disengaged by means of a bell-crank 31 having a pedal 32 thereon convenient to the driver's seat 33.

The bars 18 and 20 are normally held in forward positions by means of springs 34 and 35, respectively, and the former is carried rearwardly by the latter when the shoulder on the cam 25 engages the hook 24 and, when the cam releases the hook 24, the parts resume normal positions because of the springs 34 and 35. However, if it is desired to render the marker rods inoperative, the hooked end 19 of the bar 18 may be disengaged from the shouldered projection on the bar 20, and the dropper valve may continue its operation without any effect on the marker rods.

Our invention is very simple though highly efficient and practical, is comparatively inexpensive, and is readily installed upon planters of different kinds, and, while we have shown a preferred embodiment of the invention, we do not limit ourselves to the specific details but may make changes thereover, provided such changes come within the scope of the following claim, and do not depart from the spirit of the invention.

Having fully described our invention, what we claim as new, and desire to secure by Letters Patent, is:—

A device of the class described, comprising a frame, a rotatable axle therein, wheels secured to said axle, a shouldered cam rotatable with said axle, a rock shaft, arms thereon, marker rods carried by said arms, a crank arm, a hooked bar pivoted to said crank arm, a supplemental rock shaft, arms thereon, seed dropper valves in operative connection therewith, and a supplemental hooked arm having a shoulder intermediate its length and in operative connection with said supplemental rock shaft, said supplemental hooked bar being intermittently engaged by said cam to actuate said valves, and said first named hooked bar being engaged by the shoulder on said supplemental hooked bar to intermittently actuate said marker rods.

EMMETT T. CARNS.
ALFRED R. BISHOP.

Copies of this patent may be obtained for five cents each, by addressing the "Commissioner of Patents, Washington, D. C."